United States Patent
Khandekar et al.

(10) Patent No.: US 9,949,278 B2
(45) Date of Patent: Apr. 17, 2018

(54) DYNAMIC POWER AMPLIFIER BACKOFF

(75) Inventors: Aamod Khandekar, San Diego, CA (US); Alexei Gorokhov, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1597 days.

(21) Appl. No.: 11/852,565

(22) Filed: Sep. 10, 2007

(65) Prior Publication Data

US 2008/0096574 A1  Apr. 24, 2008

Related U.S. Application Data

(60) Provisional application No. 60/843,893, filed on Sep. 11, 2006.

(51) Int. Cl.
| | |
|---|---|
| *G08C 17/00* | (2006.01) |
| *H04W 72/08* | (2009.01) |
| *H04W 52/26* | (2009.01) |
| *H04W 52/36* | (2009.01) |
| *H04W 52/52* | (2009.01) |

(52) U.S. Cl.
CPC ....... *H04W 72/085* (2013.01); *H04W 52/265* (2013.01); *H04W 52/36* (2013.01); *H04W 52/367* (2013.01); *H04W 52/52* (2013.01)

(58) Field of Classification Search
USPC ........ 370/229, 230, 236, 310, 311, 328, 329
See application file for complete search history.

(56) References Cited

U.S. PATENT DOCUMENTS

| | | | | |
|---|---|---|---|---|
| 5,481,308 | A | * | 1/1996 | Hartung et al. ......... 375/240.11 |
| 6,061,568 | A | * | 5/2000 | Dent ............................. 455/450 |
| 6,493,331 | B1 | | 12/2002 | Walton et al. |
| 7,502,341 | B2 | * | 3/2009 | Matoba et al. ............... 370/319 |
| 8,280,385 | B2 | * | 10/2012 | Jones et al. ................... 455/447 |
| 2004/0063437 | A1 | * | 4/2004 | Braun et al. .................. 455/450 |
| 2004/0147276 | A1 | * | 7/2004 | Gholmieh et al. ............ 455/522 |
| 2004/0152423 | A1 | * | 8/2004 | Reznik ...................... 455/67.11 |

(Continued)

FOREIGN PATENT DOCUMENTS

| | | |
|---|---|---|
| JP | 2005244958 A | 9/2005 |
| RU | 2177205 | 12/2001 |

(Continued)

OTHER PUBLICATIONS

Alexi Gorokhiv, Qualcomm Inc.: "Dynamic PA backoff techniques and SC-FDMA" 3GPP2, C30-20060911-080, Sep. 11, 2006, pp. 1-35, XP002496285.

(Continued)

*Primary Examiner* — Kwang B Yao
*Assistant Examiner* — Nguyen Ngo
(74) *Attorney, Agent, or Firm* — MG-IP Law, P.C.

(57) ABSTRACT

Systems and methodologies are described that facilitate mitigating effect of non-linear distortion from a power amplifier on a spectral mask margin. Power limit indications can be analyzed in scheduling mobile devices. Mobile devices with power limits can be scheduled on inner subbands. Other mobile devices can employ remaining portions of an allocated spectrum. Further, mobile devices can evaluate and establish a power amplifier backoff based upon the subband scheduling.

43 Claims, 13 Drawing Sheets

(56) References Cited

U.S. PATENT DOCUMENTS

| | | | |
|---|---|---|---|
| 2005/0011488 A1 | 1/2005 | Doucet | |
| 2005/0096062 A1* | 5/2005 | Ji et al. | 455/450 |
| 2005/0111397 A1 | 5/2005 | Attar et al. | |
| 2005/0111488 A1 | 5/2005 | Subramanian et al. | |
| 2005/0272432 A1* | 12/2005 | Ji et al. | 455/449 |
| 2007/0097962 A1* | 5/2007 | Yoon et al. | 370/352 |
| 2007/0121553 A1* | 5/2007 | Yoon et al. | 370/335 |
| 2007/0230428 A1* | 10/2007 | Seki et al. | 370/341 |
| 2008/0025254 A1* | 1/2008 | Love et al. | 370/329 |
| 2008/0045255 A1* | 2/2008 | Revel et al. | 455/510 |
| 2008/0095263 A1* | 4/2008 | Xu et al. | 375/295 |
| 2008/0171516 A1 | 7/2008 | Kakura | |
| 2008/0291831 A1* | 11/2008 | Alpert et al. | 370/236 |

FOREIGN PATENT DOCUMENTS

| | | |
|---|---|---|
| RU | 2254590 | 6/2005 |
| TW | 200423651 | 11/2004 |
| WO | WO-2001076098 | 10/2001 |
| WO | WO04075444 | 9/2004 |
| WO | WO05125262 | 12/2005 |
| WO | 06007318 | 1/2006 |
| WO | WO2006077842 A1 | 7/2006 |

OTHER PUBLICATIONS

Jim Tomcik: "QFDD Technology Overview Presentation" Internet Citation, [Online] Nov. 15, 2005, pp. 1-75, XP002422346, Retrieved from the Internet URL: http://ieee802.org/20/Contribs/C802.20-05-59r1.pdf>.

Partial International Search Report—PCT/US2007/078099, International Search Authority—European Patent Office—dated Apr. 28, 2008.

International Search Report—PCT/US2007/078099, International Search Authority—European Patent Office—dated Oct. 7, 2008.

Written Opinion—PCT/US2007/078099, International Search Authority—European Patent Office—dated Oct. 7, 2008.

International Preliminary Report on Patentability, PCT/US2007/078099—The International Bureau of WIPO—Geneva, Switzerland, dated Mar. 17, 2009.

Taiwan Search Report—TW096133950—TIPO—dated Jul. 13, 2011.

European Search Report—EP11178180—Search Authority—Munich—dated Oct. 19, 2011.

Taiwan Search Report—TW101105363—TIPO—dated Jan. 9, 2014.

* cited by examiner

DYNAMIC POWER AMPLIFIER BACKOFF

CROSS-REFERENCE TO RELATED APPLICATIONS

This application claims the benefit of U.S. Provisional Patent application Ser. No. 60/843,893 entitled "A METHOD AND APPARATUS FOR DYNAMIC POWER AMPLIFIER (PA) BACKOFF" which was filed Sep. 11, 2006. The entirety of the aforementioned application is herein incorporated by reference.

BACKGROUND

I. Field

The following description relates generally to wireless communications, and more particularly subband scheduling and power amplifier backoff.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system may simultaneously support communication for multiple wireless terminals or user devices. Each terminal communicates with one or more access points via transmissions on the forward and reverse links. The forward link (or downlink) refers to the communication link from the access points to the terminals, and the reverse link (or uplink) refers to the communication link from the terminals to the access points.

Wireless systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Typically, each access point supports terminals located within a specific coverage area referred to as a sector. A sector that supports a specific terminal is referred to as the serving sector. Other sectors, not supporting the specific terminal, are referred to as non-serving sectors. Terminals within a sector can be allocated specific resources to allow simultaneous support of multiple terminals. However, transmissions by terminals in neighboring sectors are not coordinated. Consequently, transmissions by terminals at sector edges can cause interference and degradation of terminal performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method that mitigates non-linear distortion on spectral mask margin is described herein. The method can comprise scheduling a first group of mobile devices on an inner subband of an allocated spectrum based upon power limitation information from the first group. In addition, the method can further comprise scheduling a subsequent group of mobile devices on a remaining portion of the allocated spectrum after scheduling the inner subband based upon power limitation information from the subsequent group.

Another aspect relates to a wireless communications apparatus that can comprise a memory that retains instructions related to scheduling mobile devices with power limits on inner subbands of a spectrum and scheduling mobile devices without power limits on remaining portions of the spectrum. The wireless communications apparatus can also include an integrated circuit coupled to the memory, configured to execute the instructions retained in the memory.

Yet another aspect relates to a wireless communications apparatus that enables dynamic power amplifier backoff. The apparatus can include means for scheduling a first group of mobile devices on an inner subband of an allocated spectrum based at least in part on power limitation information from the first group. The apparatus can additionally include means for scheduling a subsequent group of mobile devices on a remaining portion of the allocated spectrum based at least in part on power limitation information from the subsequent group and means for selecting subbands based at least part on power limitation information.

Still another aspect relates to a computer-readable medium that can comprise code for causing a computer to schedule mobile devices with power limits on inner subbands of a spectrum. The computer-readable medium can further include code for causing a computer to schedule mobile devices without power limits on remaining portions of the spectrum.

According to another aspect, an apparatus can comprise an integrated circuit configured to schedule a first group of mobile devices on an inner subband of an allocated spectrum based at least in part on power limitation information received from the first group and schedule a subsequent group of mobile devices on a remaining portion of the allocated spectrum after scheduling the inner subband based at least in part on power limitation information received from the subsequent group.

According to yet another aspect, a method that facilitates dynamically adjusting power amplifier backoff is described herein. The method can comprise receiving a subband assignment, evaluating a power amplifier backoff based at least in part on the received subband assignment and adjusting a power amplifier according to the evaluated backoff.

Another aspect described herein relates to a wireless communications apparatus that can include a memory that retains instructions related to evaluating a power amplifier backoff based at least in part on a received subband assignment and changing a power amplifier based upon the evaluated backoff. In addition, the wireless communications apparatus can comprise an integrated circuit coupled to the memory, configured to execute the instructions retained in the memory.

Yet another aspect relates to a wireless communications apparatus that mitigates impact of non-linear distortion on spectral mask margin. The apparatus can comprise means for receiving a subband assignment and means for determining a power amplifier backoff based at least in part on the received subband assignment. In addition, the wireless communications apparatus can include means for adjusting a power amplifier according to the determined backoff.

Still another aspect relates to a computer-readable medium that can comprise code for causing a computer to evaluate a power amplifier backoff based at least in part on a subband assignment. The computer-readable medium can further include code for causing a computer to configure a power amplifier according to the evaluated backoff.

A further aspect described herein relates to an apparatus that can comprise an integrated circuit. The integrated circuit can be configured to determine a power amplifier backoff based at least in part on a subband assignment received from a base station. Further, the integrated circuit can adjust a power amplifier according to the determined power amplifier backoff.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
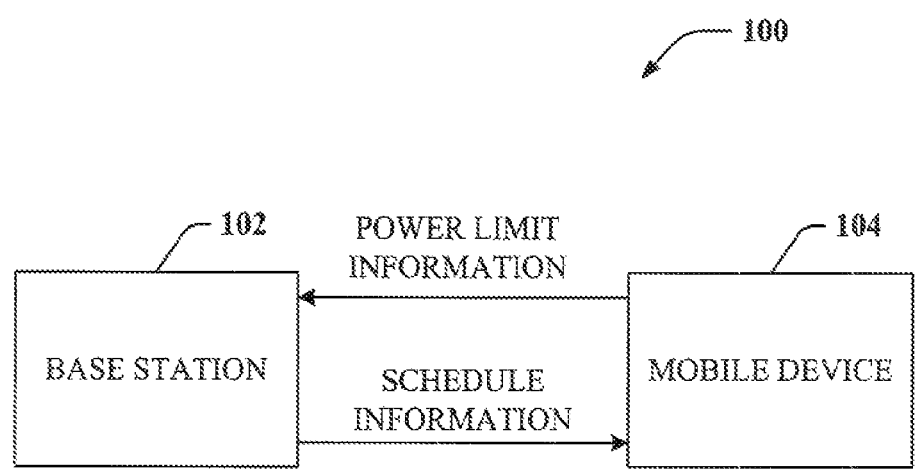
FIG. 1 is a block diagram of a system that facilitates dynamic power amplifier backoff in accordance with an aspect of the subject disclosure.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as multiple-access communication systems, broadcast systems, wireless local area networks (WLANs), etc. The terms "systems" and "networks" are often used interchangeably. A multiple-access system may utilize a multiple-access scheme such as Code Division Multiple Access (CDMA), Time Division Multiple Access (TDMA), Frequency Division Multiple Access (FDMA), Orthogonal FDMA (OFDMA), Single-Carrier FDMA (SC-FDMA), etc. A multiple-access system may also utilize a combination of multiple-access schemes, e.g., one or more multiple-access schemes for the downlink and one or more multiple-access schemes for the uplink.

OFDMA utilizes Orthogonal Frequency Division Multiplexing (OFDM), which is a multi-carrier multiplexing scheme. SC-FDMA may utilize Localized Frequency Division Multiplexing (LFDM), Interleaved FDM (IFDM), Enhanced FDM (EFDM), etc., which are different single-carrier multiplexing schemes that are collectively referred to as Single-Carrier FDM (SC-FDM). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. LFDM transmits data on continuous subcarriers, IFDM transmits data on subcarriers that are distributed across the system bandwidth, and EFDM transmits data on groups of continuous subcarriers.

OFDM has certain desirable characteristics, including the ability to combat multipath effects that are prevalent in a terrestrial communication system. However, a major drawback with OFDM is a high peak-to-average power ratio (PAPR) for an OFDM waveform, i.e., the ratio of the peak power to the average power for the OFDM waveform can be high. The high PAPR results from possible in-phase (or coherent) addition of all the subcarriers when they are independently modulated with data. The high PAPR for the OFDM waveform is undesirable and may degrade performance. For example, large peaks in the OFDM waveform may cause a power amplifier to operate in a highly non-linear region or possibly clip, which may then cause intermodulation distortion and other artifacts that can degrade signal quality. To avoid non-linearity, the power amplifier to be operated with backoff at an average power level that is lower than the peak power level. By operating the power amplifier with backoff from peak power, where the backoff may range from 4 to 7 dB, the power amplifier can handle large peaks in the waveform without generating excessive distortion.

SC-FDM (e.g., LFDM) has certain desirable characteristics such as robustness against multipath effects, similar to OFDM. Furthermore, SC-FDM does not have a high PAPR since modulation symbols are sent in the time domain with SC-FDM. The PAPR of an SC-FDM waveform is determined by the signal points in the signal constellation selected for use (e.g., M-PSK, M-QAM, etc). However, the time-domain modulation symbols in SC-FDM are prone to intersymbol interference due to a non-flat communication channel. Equalization may be performed on the received symbols to mitigate the deleterious effects of intersymbol interference.

In an aspect, OFDM and SC-FDM (e.g., LFDM) may be used for transmission on a given link (e.g., uplink). In general, link efficiency of an OFDM waveform exceeds that of an SC-FDM waveform. The higher link efficiency of OFDM is offset by a larger power amplifier backoff for OFDM than SC-FDM. SC-FDM thus has a low PAPR advantage over OFDM. For UEs with high signal-to-noise ratios (SNRs), the link level gain of OFDM may exceed the PAPR advantage of SC-FDM. By utilizing both OFDM and SC-FDM, the system may benefit from the higher link efficiency of OFDM for high SNR scenarios as well as the PAPR advantage of SC-FDM for low SNR scenarios.

In general, any SC-FDM scheme may be used jointly with OFDM. Furthermore, OFDM and SC-FDM may be jointly used for the uplink, or the downlink, or both the uplink and downlink. For clarity, much of the following description is for joint use of OFDM and LFDM on the uplink.

Referring now FIG. 1, illustrated is a block diagram of a system 100 that provides dynamic power amplifier backoff. System 100 includes at least one base station 102 and at least one mobile device 104 supported by a sector of base station 102. The term sector can refer to a base station and/or an area covered by a base station, depending on context. A single base station and mobile device are illustrated for simplicity. However, system 100 can include multiple base stations and mobile devices. Base station 102 can explicitly control the subband schedule of mobile device 104. Subband scheduling enables multi-user diversity gains by scheduling mobile devices adaptively over limited regions of the system frequency band according to channel conditions, among other things. The subband size should provide enough frequency diversity to prevent performance degradation for fast moving mobile devices as well as degradation in sector throughput with equal grade of service scheduling. Small subbands may also result in loss of trunking efficiency of subband scheduling (e.g., the smaller the subbands, the less candidate mobile devices per subband to choose from).

Figure 2:
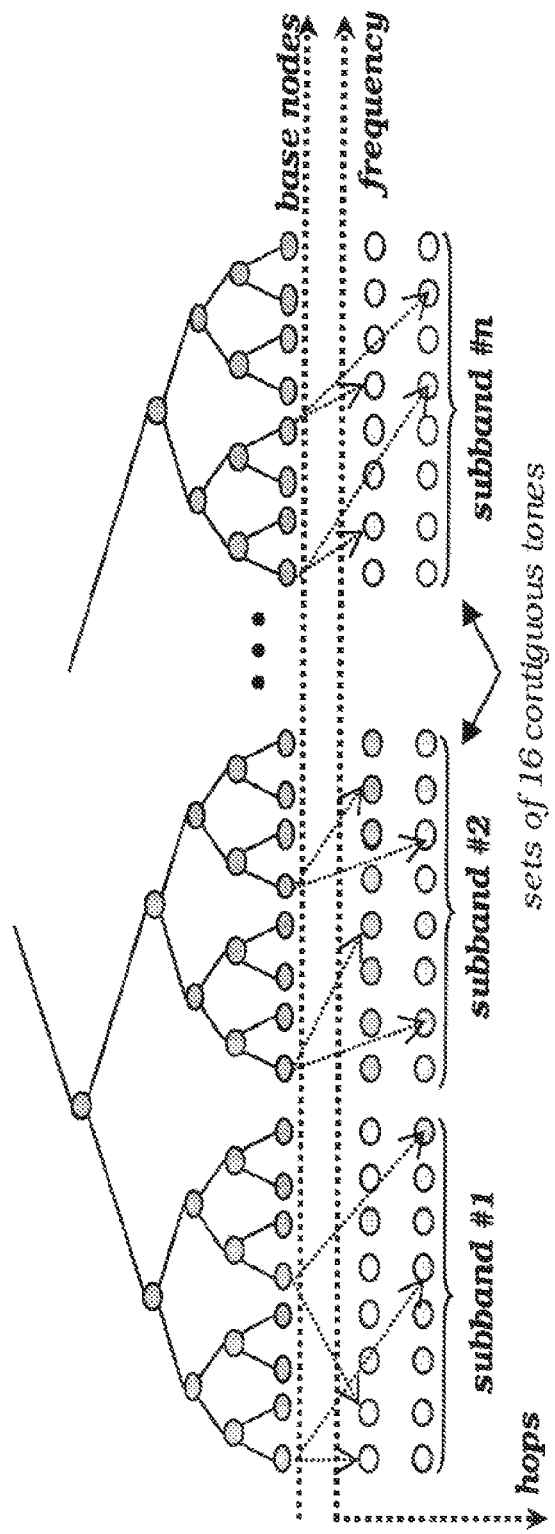
FIG. 2 is an illustration of an channel tree structure for supporting subband scheduling in accordance with one or more aspects presented herein.

Turning briefly to FIG. 2, illustrated is an exemplary channel tree with local hopping. A mobile device, scheduled within a certain subband and having a bandwidth assignment less than the entire subband, hops locally across the subband in order to maximize channel interference diversity. In FIG. 2, each base node maps to 16 contiguous tones in frequency. A collection of eight base nodes maps to a subband, which consists of 128 contiguous tones. Within the subband, groups of 16 tones (i.e., the base nodes) hop in a pseudo-random manner. In addition to the subband scheduling mode, diversity mode can be beneficial. A sector can serve predominantly fast moving users (e.g., a sector cover a highway). In such cases, base nodes of the channel may hop across the entire band.

Referring back to FIG. 1, typically, in order to support subband scheduling, a mobile device should provide feedback about forward link channel properties relative to different subbands. The amount of feedback should balance gains in forward link performance due to subband scheduling versus the reverse link overhead caused by feedback channels. A proper tradeoff depends on the load of reverse link control channel which, besides subband scheduling feedback, carries other reverse link control information.

According to one aspect of the subject disclosure, mobile device 104 sends power limit information to base station 102. Base station 102 employs the received power limit information to schedule mobile device 104 on a subband. Power limit information may include information related to power amplifier size or capabilities of mobile device 104. Moreover, power limit information may include different power levels that may be utilized on different types of assignments. For example, mobile device 104 may have one power level available in an inner subband while having another power level available on an edge subband. The mobile device 104 may also report the maximum power it can achieve if its assignment spans the entire bandwidth, an inner subband, or a single base node. In addition, the information can convey the effect of interference constraints, if any. Furthermore, power limit information can comprise location within a given sector or cell and/or location information relative to more than one sector or cell. Additionally, the power limit information transmitted by mobile device 104 can include a carrier-to-interference parameter experienced by mobile device 104. While FIG. 1 depicts mobile device 104 transmitting power limit information to base station 102, it is to be appreciated that base station 102 may infer such information from its link and communications with mobile device 104. For example, base station 102 can evaluate a received power level or received feedback to infer any power constraint imposed upon mobile device 104.

Base station 102 employs the power limit information to schedule mobile device 104 on subbands available to system 100. In accordance with one aspect of the subject disclosure, base station 102 schedules power limited mobile devices predominantly on inner subbands. Mobile devices without power limitations are scheduled on the remaining spectrum. Base station 102 considers power limitations of mobile device 104 in addition to channel selectivity across subbands when selecting subbands. Base station 102 transmits schedule information to mobile device 104 indicating the subband to be employed by mobile device 104.

Figure 3:
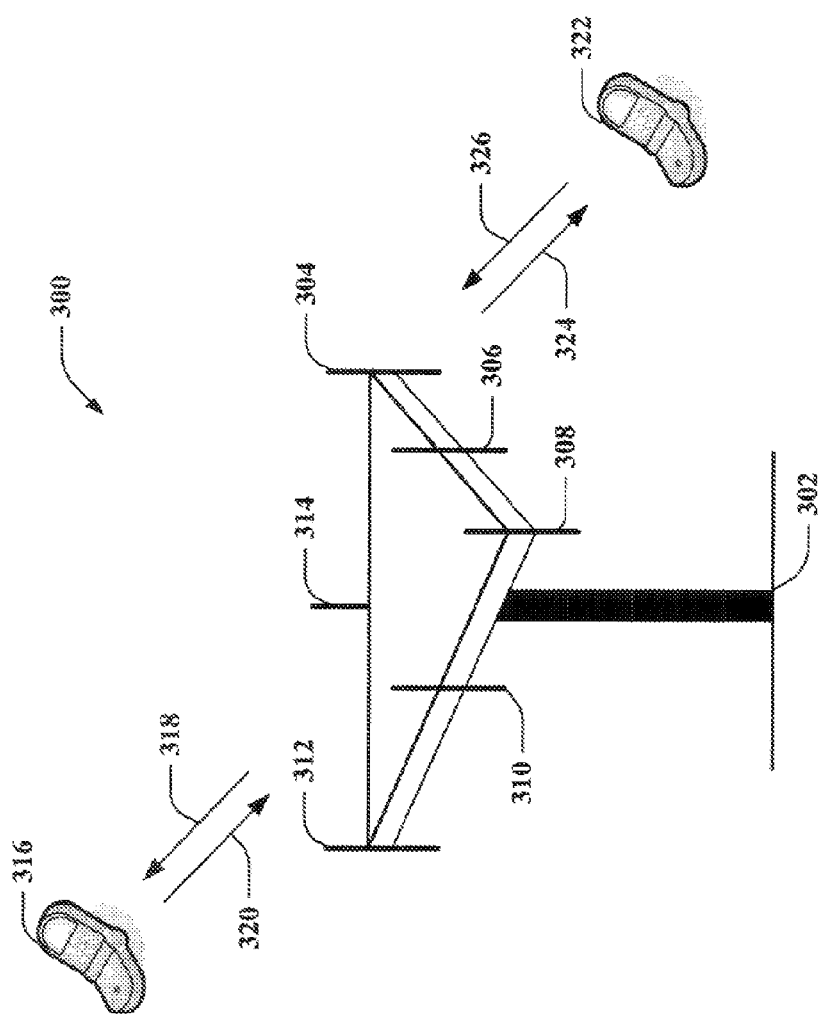
FIG. 3 is an illustration of a wireless communication system in accordance with various aspects set forth herein.

Referring now to FIG. 3, a wireless communication system 300 is illustrated in accordance with various embodiments presented herein. System 300 comprises a base station 302 that may include multiple antenna groups. For example, one antenna group may include antennas 304 and 306, another group may comprise antennas 308 and 310, and an additional group may include antennas 312 and 314. Two antennas are illustrated for each antenna group; however, more or fewer antennas may be utilized for each group. Base station 302 may additional include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 302 may communicate with one or more mobile devices such as mobile device 316 and mobile device 322; however, it is to be appreciated that base station 302 may communicate with substantially any number of mobile devices similar to mobile devices 316 and 322. Mobile devices 316 and 322 can be, for example, cellular phones, smart phones, laptops, handheld communication devices, handheld computing devices, satellite radios, global positioning systems, PDAs, and/or any other suitable device for communicating over wireless communication system 300. As depicted, mobile device 316 is in communication with antennas 312 and 314, where antennas 312 and 314 transmit information to mobile device 316 over a forward link 318 and receive information from mobile device 316 over a reverse link 320. Moreover, mobile device 322 is in communication with antennas 304 and 306, where antennas 304 and 306 transmit information to mobile device 322 over a forward link 324 and receive information from mobile device 322 over a reverse link 326. In a frequency division duplex (FDD) system, forward link 318 may utilize a different frequency band than that used by reverse link 320, and forward link 324 may employ a different frequency band than that employed by reverse link 326, for example. Further, in a time division duplex (TDD) system, forward link 318 and reverse link 320 may utilize a common frequency band and forward link 324 and reverse link 326 may utilize a common frequency band.

Each group of antennas and/or the area in which they are designated to communicate may be referred to as a sector of base station 302. For example, antenna groups may be designed to communicate to mobile devices in a sector of the areas covered by base station 302. In communication over forward links 318 and 324, the transmitting antennas of base station 302 may utilize beamforming to improve signal-to-noise ratio of forward links 318 and 324 for mobile devices 316 and 322. Also, while base station 302 utilizes beamforming to transmit to mobile devices 316 and 322 scattered randomly through an associated coverage, mobile devices in neighboring cells may be subject to less interference as compared to a base station transmitting through a single antenna to all its mobile devices. According to an example, system 300 may be a multiple-input multiple-output (MIMO) communication system. Further, system 300 may utilize any type of duplexing technique to divide communication channels (e.g., forward link, reverse link . . . ) such as FDD, TDD, and the like.

Figure 4:
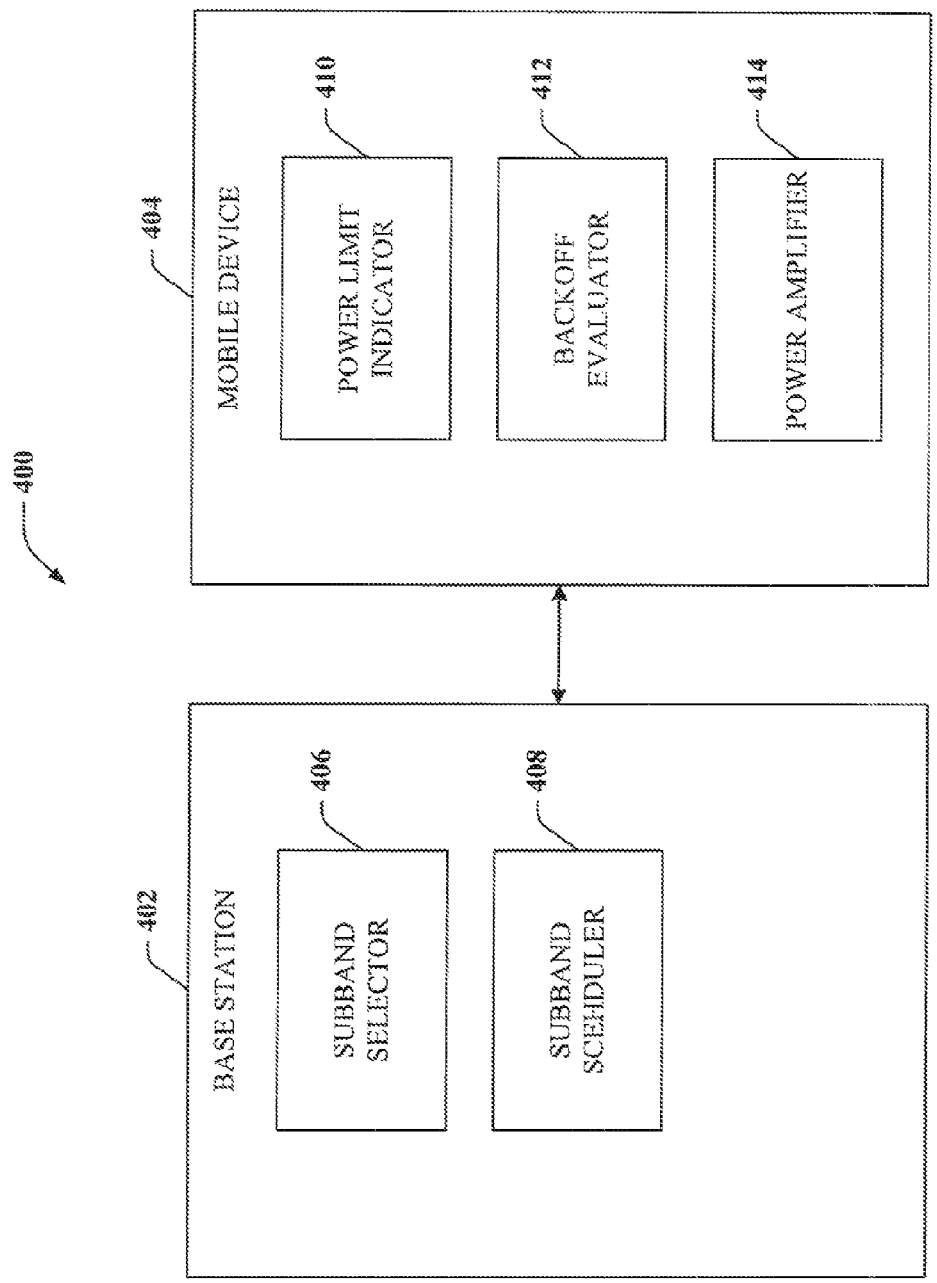
FIG. 4 is an illustration of an example wireless communications system that effectuates dynamic power amplifier backoff based upon subband scheduling.

Turning now to FIG. 4, illustrated is a wireless communications system 400 that effectuates subband scheduling based upon considerations of power limitations. System 400 includes a base station 402 that communicates with a mobile device 404 (and/or any number of disparate mobile devices (not shown)). Base station 402 may transmit information to mobile device 404 over a forward link channel; further base station 402 may receive information from mobile device 404 over a reverse link channel. Moreover, system 400 may be a MIMO system.

System 400 employs a mitigation technique that reduces effect of non-linear distortion on spectrum mask margin. Non-linear distortion relates to the phenomenon of a non-linear relationship between input and output of, for example, an electronic device. According to one aspect, the non-linear relationship concerned relates to a power amplifier.

Mobile device 404 may include a power limit indicator 410, backoff evaluator 412 and a power amplifier 414. Power limit indicator 410 of mobile device 404 determines a power limitation indication that reflects power constraints imposed upon mobile device 404. Mobile device 404 transmits the power limitation indication to base station 402. It should be appreciated that base station 402 may infer such information from its link and communications with mobile device 404. For example, base station 402 can evaluate a received power level or received feedback to determine any power constraint imposed upon mobile device 404. The power limitation indication may include information related to power amplifier size or capabilities of mobile device 404. In addition, the indicator can convey the effect of interference constraints, if any. Furthermore, power limitation information can comprise a location within a given sector or cell and/or location information relative to more than one sector or cell. Additionally, the power limit information transmitted by mobile device 404 can include a carrier-to-interference parameter experienced by mobile device 404.

Base station 402 receives the power limitation indication from mobile device 404 and employs the indication to determine subband scheduling. Base station 402 includes a subband selector 406 and a subband scheduler 408. Subband selector 406 selects a subband based upon considerations of the power limitation indication of mobile device 404 and channel selectivity across subbands. Subband scheduler 408 schedules mobile device 404 and other mobile devices served by base station 402. In accordance with an aspect of the subject disclosure, subband scheduler 408 schedules mobile devices with power limitations predominantly on the inner subbands. For example, high quality of service (QoS)

users with a limited power amplifier size at a sector or cell edge can be scheduled on the inner subbands. Best efforts users at sector or cell edge that are not constrained by interference control (e.g., users' transmit power limited by a busy bit from adjacent sectors) can also be scheduled on the inner subbands of the spectrum allocation. Further, subband scheduler 408 schedules mobile devices without power limitations on the remaining spectrum. For example, best efforts users at sector or cell edge that are constrained by interference control (e.g. users' transmit power not limited by a busy bit from adjacent sectors) can be scheduled on the remaining portions of the spectrum after scheduling power limited users. In addition, users with large power amplifier sizes can be scheduled on the remaining spectrum allocated as well as users with high carrier-to-interference (C/I) ratios. Users with high C/I may only marginally benefit from a further increase in C/I that may result from being scheduled on the middle regions of the allocated spectrum.

Inner subbands are subbands away from the edges of spectrum allocation or total bandwidth. Out-of-band emissions are emissions on a frequency or frequencies immediately outside the bandwidth resulting from a modulation process. Out-of-band emission level depends on total bandwidth spanned by an assignment and proximity of this span to an edge of spectrum allocation or maximum bandwidth of the system. Typically, the larger the assignment span (i.e., wide assignment), the higher the out-of-band emission level will be. In addition, an assignment farther away from the edge results in a lower out-of-band emission level. Out-of-band emission level may be measured as a function of total power over 1 MHz adjacent to the channel allocation. According to an example, total transmit power integrated over 1 MHz should not exceed −13 dBm. Additionally, for a typically average transmitted power of 23 dBm, a spectral mask requires approximately 30 dB attenuation in the adjacent 1 MHz.

A spectrum mask margin is defined as a difference between an allowed emission level and an actual emission level. Spectrum mask margin, $L_{mask}$ can be depicted according to the following:

$$L_{mask} = 10 * \log_{10}\left(\frac{\int S(f)df}{\int_{1 MHz} S(f)df} \frac{P_{mask}}{P_{TX}}\right)$$

Pursuant to this illustration, $P_{mask}$ is the mask limit. According to an example, $P_{mask}$ should not exceed −13 dbm. $P_{TX}$ is the total transmitted power. The quantity $\int S(f)df$ represents the power spectral density at a power amplifier output. The quantity $$\int_{1MHz} S(f)df$$

is the 1 MHz adjacent to the channel allocation. A positive value indicates a margin between the allowed and the actual emission level. A negative value indicates the allowed emission level is exceeded.

Users have an adequate margin in an edge subband in both an OFDMA and LFDMA system if the users employ a large backoff or are given a small assignment. In the situation with users employing small backoff, OFDMA users experience a negative margin with medium and large assignments while LFDMA users experience a small positive margin with a medium assignment. For users scheduled on a middle or inner subband, the users experience a positive margin at low backoff in both OFDMA system and LFDMA systems. By scheduling users in a middle subband, both OFDMA and LFDMA have a sufficient spectral mask margin even at a 0 dB backoff indicating that both can operate at that low backoff. Accordingly, the PAPR disadvantage of OFDMA does not affect its power efficiency relative to LFDMA when users are scheduled away from the edge of spectrum allocation.

Base station 402 transmits assignment and scheduling information to mobile device 404. Mobile device 404 includes backoff evaluator 412 to determine a backoff for power amplifier 414 based upon the scheduling information. In the situation where the scheduling information received by mobile device 404 indicates a medium or large assignment scheduled in an edge subband, backoff evaluator 412 will determine a large backoff. Typically, this back needs to be about 2 dB greater for OFDMA systems than for LFDMA systems in order to maintain a similar margin to the spectral mask. However, if subband scheduler 408 indicates mobile device is scheduled on a middle or interior subband, backoff evaluator 412 determines a low backoff that is sufficient to maintain an adequate marking to the spectral mask. According to an aspect of the subject disclosure, backoff evaluator 412 adjusts the power amplifier 414 to employ a lower backoff (i.e., a higher transmit power) when mobile device 404 is scheduled on an inner subband. When scheduled on an edge subband, power amplifier 414 operates at a higher backoff (i.e., a lower transmit power). In addition, the width of the assignment can be taken into account. For example, when mobile device 404 is scheduled over 16 carriers (i.e., one base node) only, out-of-band emissions are low as the assignment is contiguous and spans a narrow portion of total bandwidth. In this situation, a low backoff and high transmit power can be tolerated.

Figure 5:
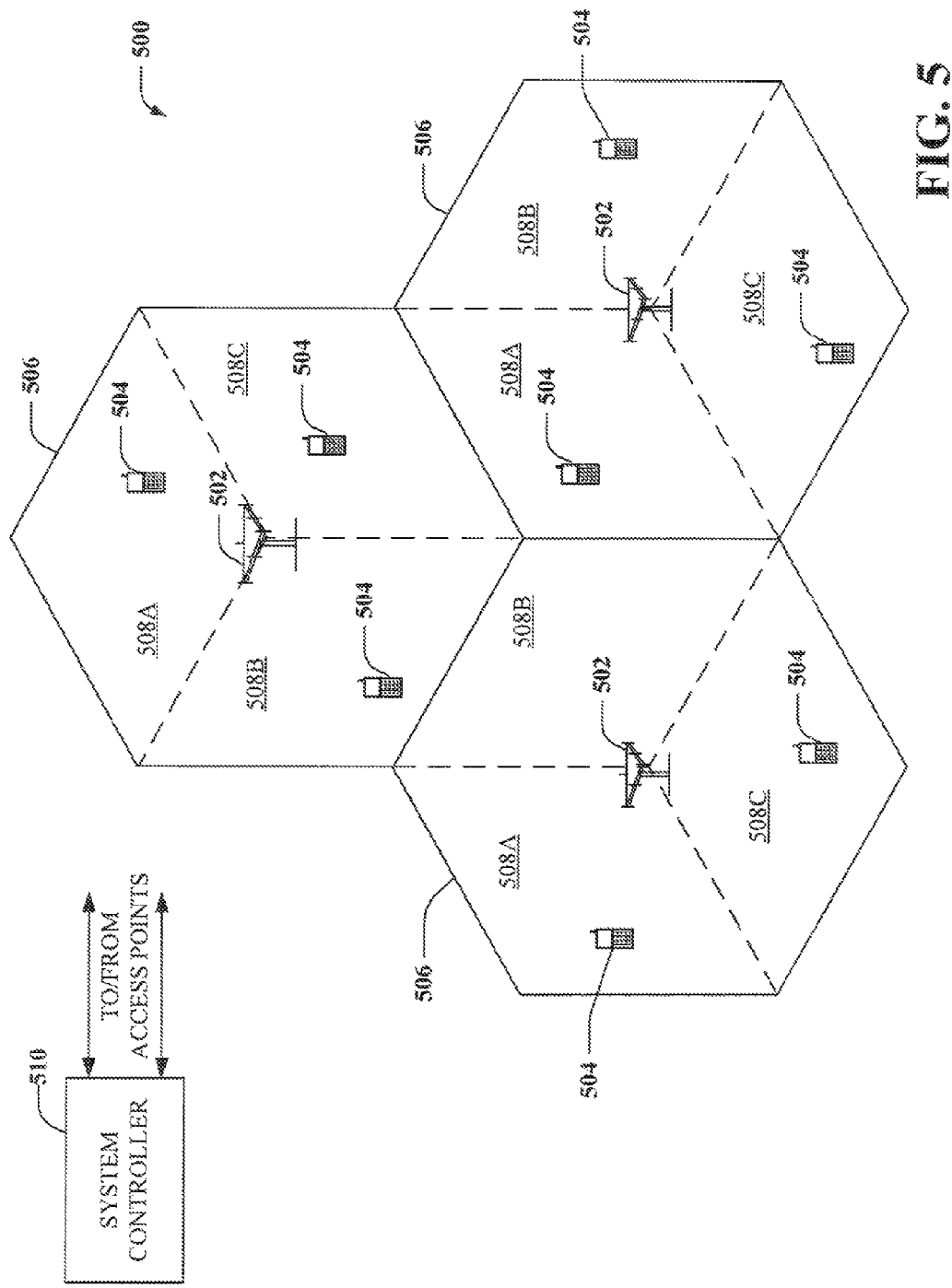
FIG. 5 is an illustration of a wireless communication system in accordance with one or more aspects presented herein.

Referring now to FIG. 5, a wireless communication system 500 in accordance with various aspects presented herein is illustrated. System 500 can comprise one or more access points 502 that receive, transmit, repeat, etc., wireless communication signals to each other and/or to one or more terminals 504. Each base station 502 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). Terminals 504 can be, for example, cellular phones, smart phones, laptops, handheld communication devices, handheld computing devices, satellite radios, global positioning systems, PDAs, and/or any other suitable device for communicating over wireless system 500. In addition, each terminal 504 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 5, each access point provides communication coverage for a particular geographic area 506. The term "cell" can refer to an access point and/or its coverage area, depending on context. To improve system capacity, an access point coverage area can be partitioned into multiple smaller areas (e.g., three smaller areas 508A, 508B and 508C). Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

Terminals 504 are typically dispersed throughout system 500. Each terminal 504 may be fixed or mobile. Each terminal 504 may communicate with one or more access points 502 on the forward and reverse links at any given moment.

For a centralized architecture, a system controller 510 couples access points 502 and provides coordination and control of access points 502. For a distributed architecture, access points 502 may communicate with one another as needed. Communication between access points via system controller 510 or the like can be referred to as backhaul signaling.

The techniques described herein may be used for a system 500 with sectorized cells as well as a system with un-sectorized cells. For clarity, the following description is for a system with sectorized cells. The term "access point" is used generically for a fixed station that serves a sector as well as a fixed station that serves a cell. The terms "terminal" and "user" are used interchangeably, and the terms "sector" and "access point" are also used interchangeably. A serving access point/sector is an access point/sector with which a terminal communicates. A neighbor access point/sector is an access point/sector with which a terminal is not in communication.

Figure 6:
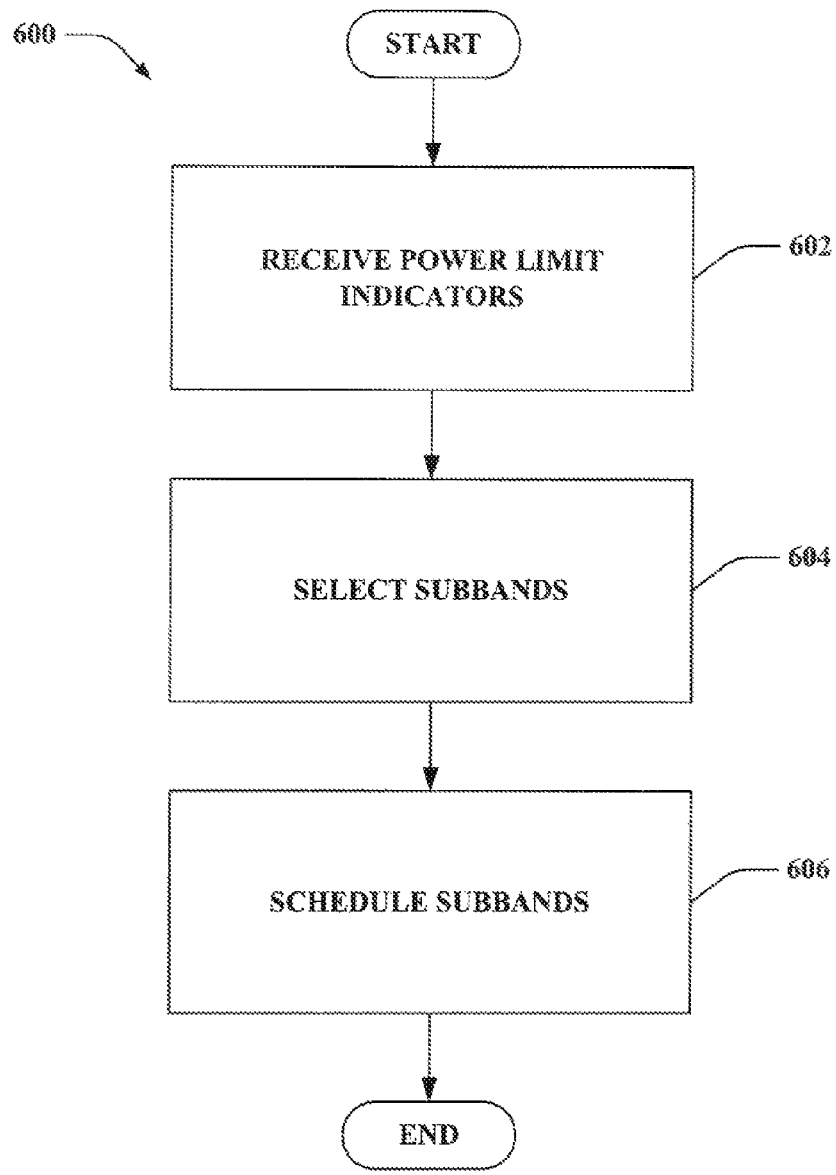
FIG. 6 is an illustration of an example methodology that facilitates subband scheduling based upon consideration of power limitations.
Figure 7:
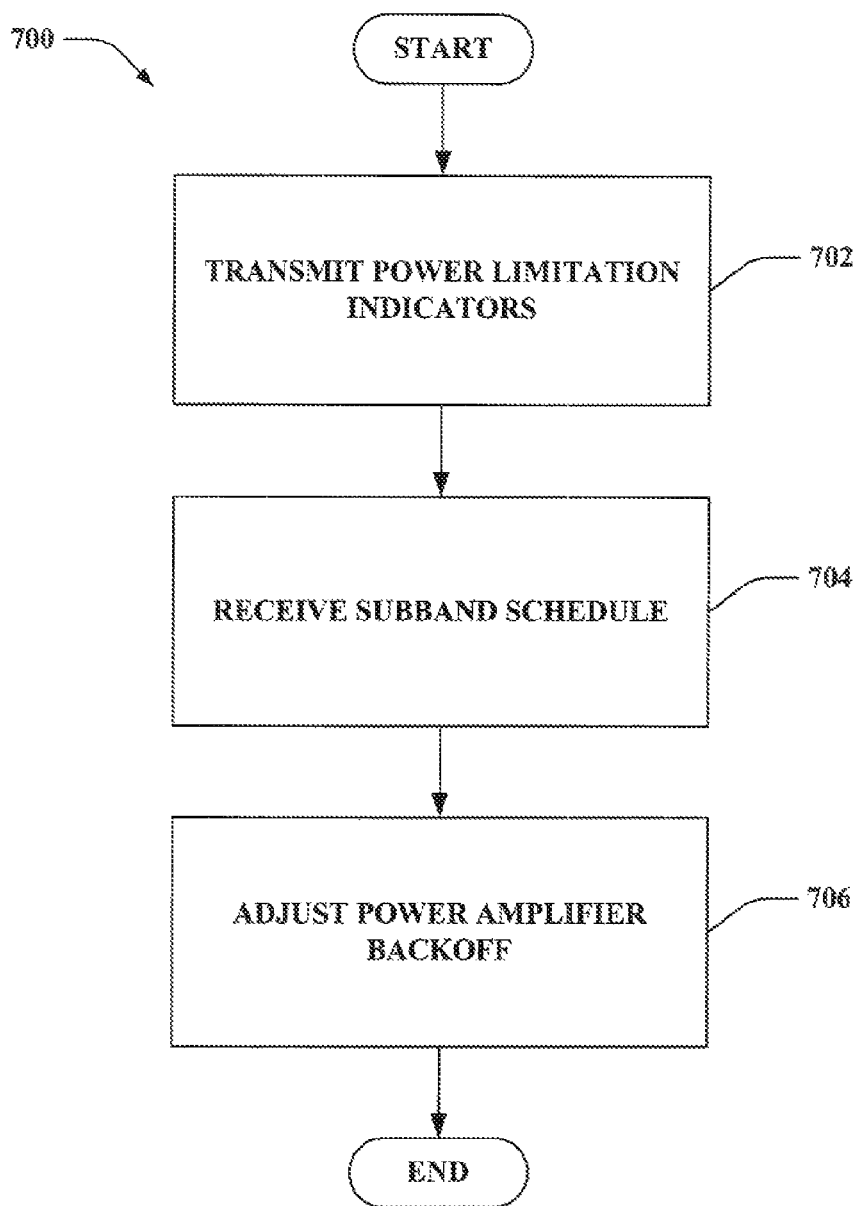
FIG. 7 is an illustration of an example methodology that facilitates adjusting a power amplifier backoff base upon a subband schedule.
Figure 8:
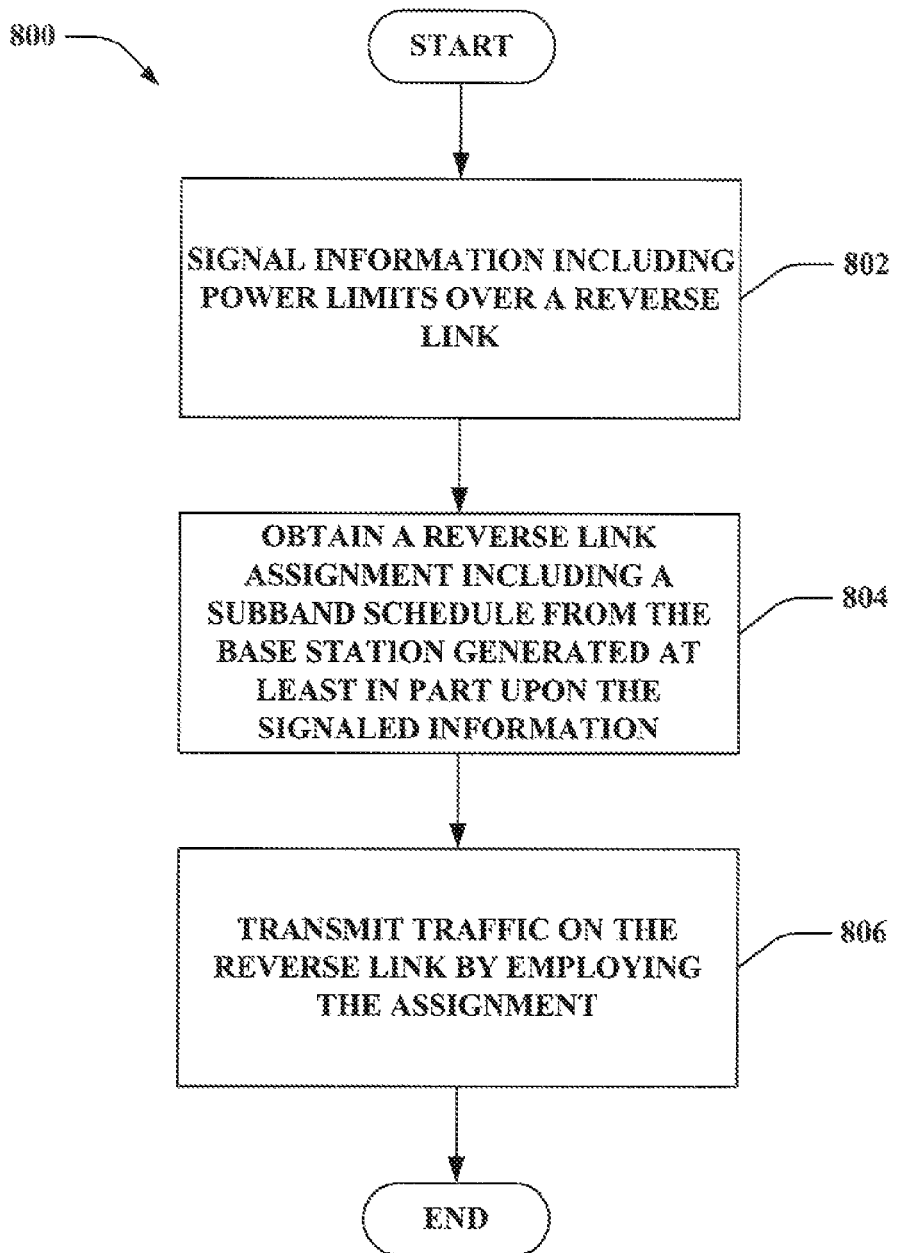
FIG. 8 is an illustration of an example methodology that facilitates signaling information over a reverse in connection with obtaining a scheduled subband assignment for transmissions.

Referring to FIGS. 6-8, methodologies relating to reverse link power adjustment based upon broadcasted interference information. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a methodology 600 that facilitates scheduling mobile devices on subbands based upon considerations of power limit indicators in a wireless communication system. At reference numeral 602, power limit indicators are received. Power limit indicators may include, among other things, information related to power amplifier size or capabilities, a presence of interference constraints, if any, a location within a given sector or cell and/or location information relative to more than one sector or cell and a carrier-to-interference parameter experienced by a mobile device. At reference numeral 604, subbands are selected. The selection can be based upon at least one of a power limitation of mobile devices, channel selectivity across subband and the like. At reference numeral 606, mobile devices are scheduled on subbands. Scheduling is based upon the received power limit indicators. For example, power limited users are schedules on inner subbands while mobile devices without power limitations are scheduled on the remaining portions of the spectrum allocation.

Turning to FIG. 7, illustrated is a methodology 700 that facilitates adjusting power amplifier backoff based upon considerations of power limitations and subband scheduling information. At reference numeral 702, power limitation indicators are transmitted to a base station or access point. Power limit indicators may include, among other things, information related to power amplifier size or capabilities, a presence of interference constraints, if any, a location within a given sector or cell and/or location information relative to more than one sector or cell and a carrier-to-interference parameter experienced by a mobile device or access terminal. At reference numeral 704, subband scheduling information is received. Subband scheduling information can include the subbands within an allocated spectrum to be employed. For example, the scheduling information can indicate that inner subbands are to be utilized. At reference numeral 706, the scheduling information is employed to evaluate a power amplifier backoff to be applied to a power amplifier. For example, if the scheduling information indicates utilization of an inner subband, a low backoff may be determined. Conversely, if the information indicates that an edge subband is to be utilized, a high backoff can be determined such that an adequate spectral mask margin is maintained.

With reference to FIG. 8, illustrated is a methodology 800 that facilitates signaling information over an uplink in connection with obtaining a scheduled subband assignment for transmission. At 802, information including power limitations may be signaled to a base station over a reverse link. According to an example, the information may be sent as part of a request; however, the claimed subject matter is not so limited. At 804, a subband assignment may be obtained from the base station, where the assignment may be generated at least in part upon the signaled information. For example, the signaled information may be employed by the base station to determine a spectral mask margins for users signaling information. Further, the base station may consider such margins in connection with yielding the subband assignment. At 806, traffic may be transmitted on the reverse link by employing the subband assignment. Thus, reverse link transmission may be effectuated at a frequency, time, rate, etc. specified in the subband assignment.

It will be appreciated that, in accordance with one or more aspects described herein, inferences can be made regarding determining power limitations, determining which users to schedule on inner subbands, determining appropriate power amplifiers backoffs, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to scheduling mobile devices on subbands of an allocated spectrum based at least in part upon considerations of power limitation information. By way of further illustration, an inference may be made related to determining a power amplifier backoff based upon consideration of a subband schedule. It will be appreciated that the foregoing examples are illustrative in nature and are not intended to limit the number of inferences that can be made or the manner in which such inferences are made in conjunction with the various embodiments and/or methods described herein.

Figure 9:
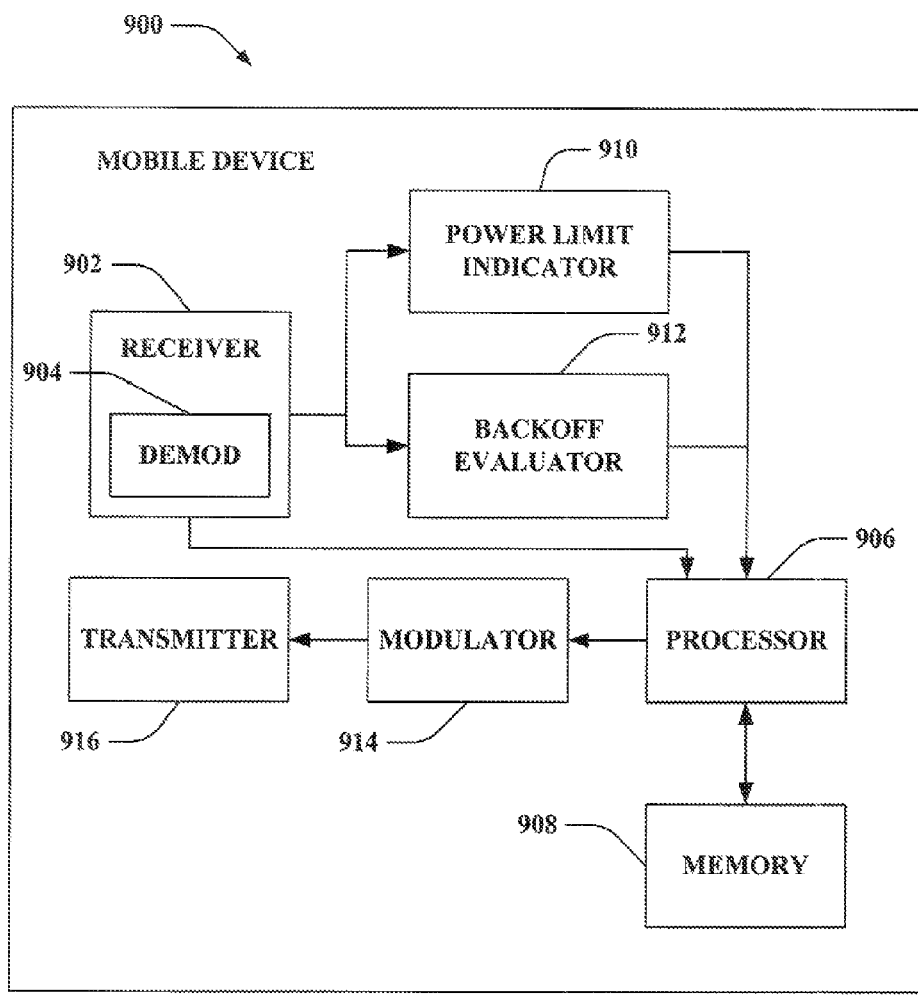
FIG. 9 is an illustration of an example mobile device that facilitates determining a power amplifier backoff value.

FIG. 9 is an illustration of a mobile device 900 that facilitates adjusting reverse link power based upon considerations of broadcasted interference information. Mobile device 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 916, a processor that controls one or more components of mobile device 900, and/or a processor that both analyzes information received by receiver 902, generates information for transmission by transmitter 916, and controls one or more components of mobile device 900.

Mobile device 900 can additionally comprise memory 908 that is operatively coupled to processor 906 and that may store data to be transmitted, received data, information related to available channels, data associated with analyzed signal and/or interference strength, information related to an assigned channel, power, rate, or the like, and any other suitable information for estimating a channel and communicating via the channel. Memory 908 can additionally store protocols and/or algorithms associated with estimating and/or utilizing a channel (e.g., performance based, capacity based, etc.).

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Processor 906 is further operatively coupled to a power limit indicator 910 that determines power limitations for mobile device 900. The power limitations may include information related to power amplifier size or capabilities of mobile device 900. In addition, the indicator can convey the effect of interference constraints, if any. Furthermore, power limitation information can comprise a location within a given sector or cell and/or location information relative to more than one sector or cell. Additionally, the power limit information transmitted by mobile device 902 can include a carrier-to-interference parameter experienced by mobile device 902. Power limit indicator 910 transmits the power limitations to a base station or access point through a transmitter 916. Additionally, receiver 902 is coupled to a backoff evaluator that may utilize subband scheduling information received from a base station or access point to determine an appropriate backoff for a power amplifier of mobile device 900. Mobile device 900 still further comprises a modulator 914 and transmitter 916 that transmits a signal (e.g., power limitation indicators) to, for instance, a base station, another mobile device, etc. Although depicted as being separate from the processor 906, it is to be appreciated that power limit indicator 910, backoff evaluator 912 and/or modulator 914 may be part of processor 906 or a number of processors (not shown).

Figure 10:
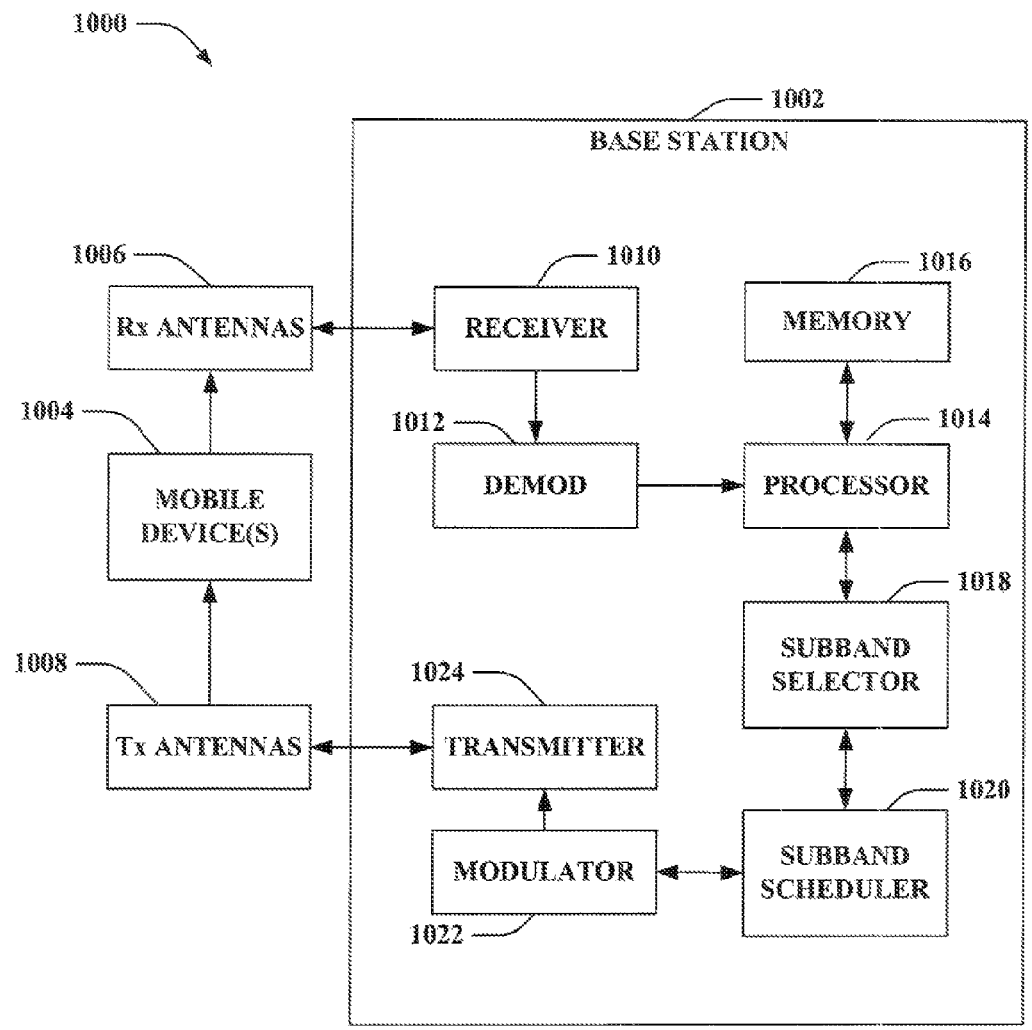
FIG. 10 is an illustration of an example system that facilitates generating a subband schedule based upon power limitation information.

FIG. 10 is an illustration of a system 1000 that facilitates reducing the amount of feedback required to control forward link transmission in a MIMO system implementing a PGRC scheme. System 1000 comprises a base station 1002 (e.g. access point, . . . ) with a receiver 1010 that receives signal(s) from one or more mobile devices 1004 through a plurality of receive antennas 1006, and a transmitter 1024 that transmits to the one or more mobile devices 1004 through a transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores information related to estimating a signal (e.g., pilot) strength and/or interference strength, data to be transmitted to or received from mobile device(s) 1004 (or a disparate base station (not shown)), and/or any other suitable information related to performing the various actions and functions set forth herein. Processor 1014 is further coupled to a subband selector 1018 that selects a subband. Subband selector 1018 selects a subband based upon considerations of the power limitation indication of mobile devices and channel selectivity across subbands.

Subband selector 1018 is coupled to subband scheduler 1020. Subband scheduler 1020 schedules mobile devices 1004 based upon consideration of power limitation information received from mobile devices 1004. For example, mobile devices with power limitations are schedules on inner subbands while mobile devices without power limitations are scheduled on portions of the remaining spectrum allocated. Modulator 1022 can multiplex the control information for transmission by a transmitter 1024 through antenna 1008 to mobile device(s) 1004. Mobile devices 1004 can be similar to mobile device 900 described with reference to FIG. 9 and employ the subband schedule to adjust power amplifier backoff. It should be appreciated that other functions can be utilized in accordance with the subject disclosure. Although depicted as being separate from the processor 1014, it is to be appreciated that subband selector 1018, subband scheduler 1020 and/or modulator 1022 may be part of processor 1014 or a number of processors (not shown).

Figure 11:
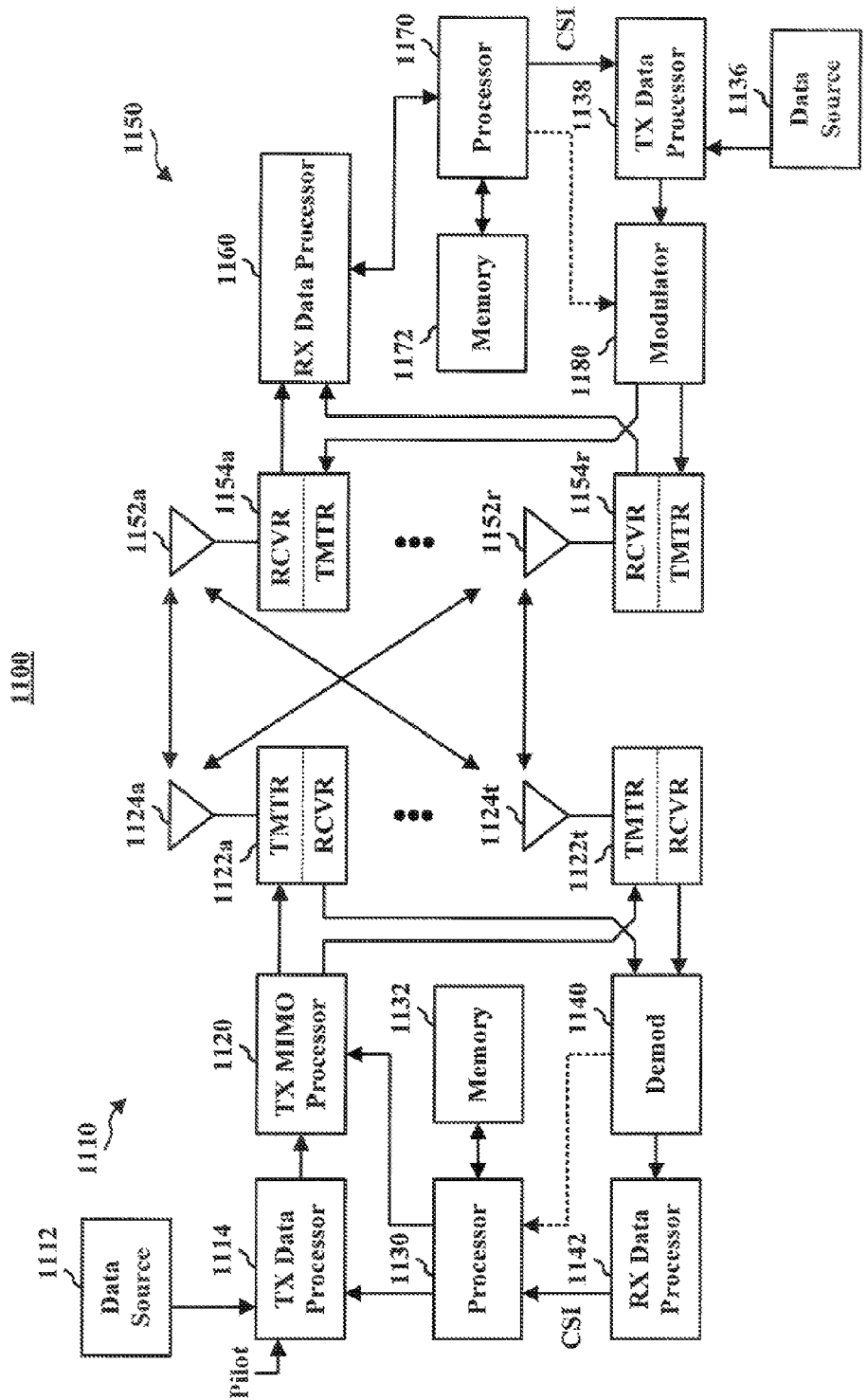
FIG. 11 is an illustration of an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 may include more than one base station and/or more than one mobile device, wherein additional base stations and/or mobile devices may be substantially similar or different from example base station 1110 and mobile device 1150 described below. In addition, it is to be appreciated that base station 1110 and/or mobile device 1150 may employ the systems (FIGS. 1, 3-5 and 9-10) and/or methods (FIGS. 6-8) described herein to facilitate wireless communication there between.

At base station 1110, traffic data for a number of data streams is provided from a data source 1112 to a transmit (TX) data processor 1114. According to an example, each data stream may be transmitted over a respective antenna. TX data processor 1114 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 1150 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1130.

The modulation symbols for the data streams may be provided to a TX MIMO processor 1120, which may further process the modulation symbols (e.g., for OFDM). TX MIMO processor 1120 then provides NT modulation symbol streams to NT transceivers (TMTR/RCVR) 1122a through 1122t. In various embodiments, TX MIMO processor 1120 applies beamforming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transceiver 1122a through 1122t are transmitted from $N_T$ antennas 1124a through 1124t, respectively.

At mobile device 1150, the transmitted modulated signals are received by NR antennas 1152a through 1152r and the received signal from each antenna 1152 is provided to a respective transceiver (TMTR/RCVR) 1154a through 1154r. Each transceiver 1154 conditions (e.g., filters, amplifies, and downconverts) a respective signal, digitizes the conditioned signal to provide samples, and further processes the samples to provide a corresponding "received" symbol stream.

An RX data processor 1160 may receive and process the $N_R$ received symbol streams from NR transceivers 1154 based on a particular receiver processing technique to provide NT "detected" symbol streams. RX data processor 1160 may demodulate, deinterleave, and decode each detected symbol stream to recover the traffic data for the data stream. The processing by RX data processor 1160 is complementary to that performed by TX MIMO processor 1020 and TX data processor 1114 at base station 1110.

A processor 1170 may periodically determine which precoding matrix to utilize as discussed above. Further, processor 1170 may formulate a reverse link message comprising a matrix index portion and a rank value portion.

The reverse link message may comprise various types of information regarding the communication link and/or the received data stream. The reverse link message may be processed by a TX data processor 1138, which also receives traffic data for a number of data streams from a data source 1136, modulated by a modulator 1180, conditioned by transceivers 1154a through 1154r, and transmitted back to base station 1110.

At base station 1110, the modulated signals from mobile device 1150 are received by antennas 1124, conditioned by transceivers 1122, demodulated by a demodulator 1140, and processed by a RX data processor 1142 to extract the reverse link message transmitted by mobile device 1150. Further, processor 1130 may process the extracted message to determine which preceding matrix to use for determining the beamforming weights.

Processors 1130 and 1170 may direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 12:
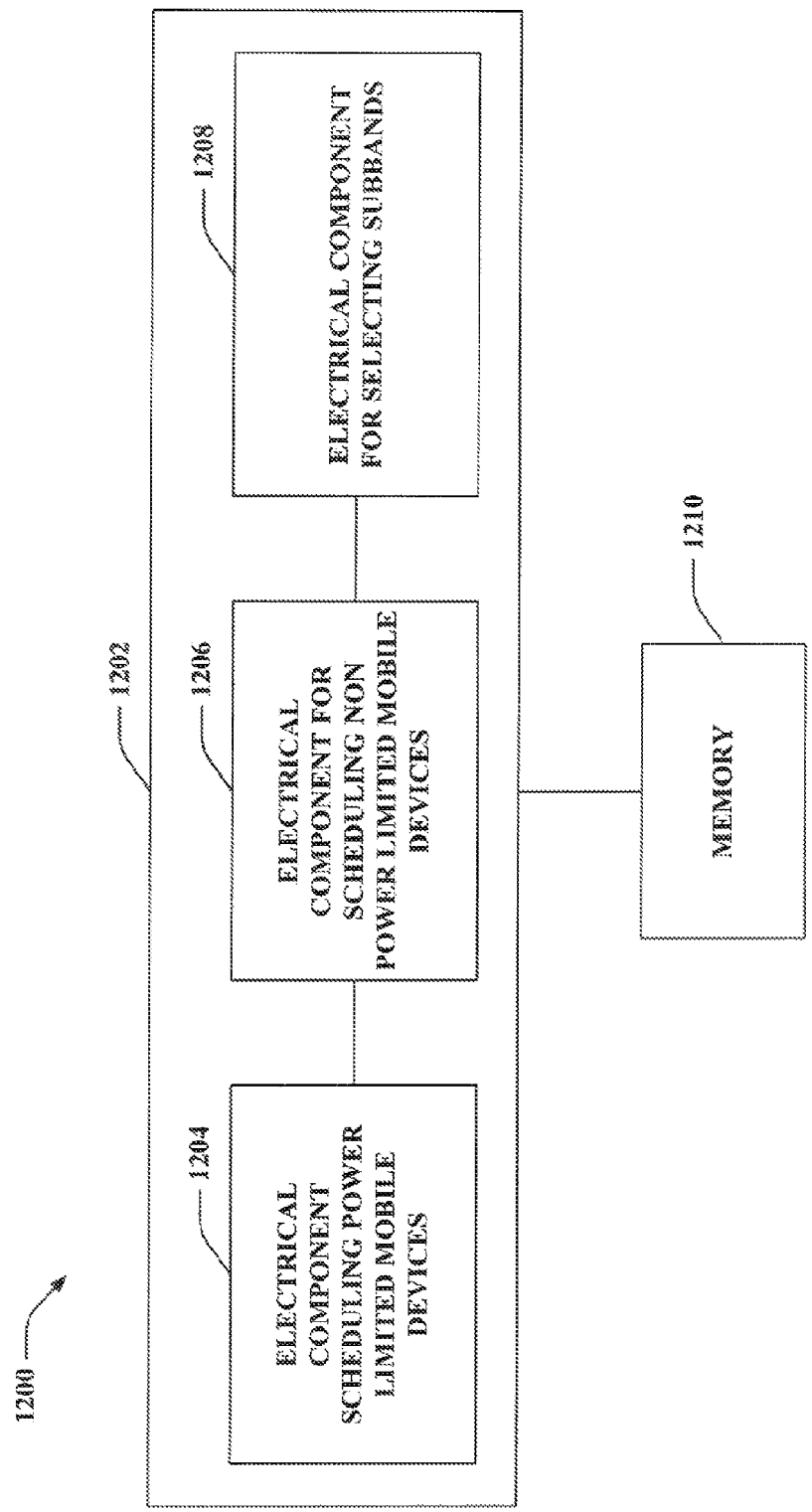
FIG. 12 is an illustration of an example system that facilitates generating a subband schedule.

With reference to FIG. 12, illustrated is a system 1200 that facilitates generates an interference indication to be broadcasted to a plurality of mobile devices. For example, system 1200 may reside at least partially within a base station. It is to be appreciated that system 1200 is represented as including functional blocks, which may be functional blocks that represent functions implemented by a processor, software, or combination thereof (e.g., firmware). System 1200 includes a logical grouping 1202 of electrical components that can act in conjunction. For instance, logical grouping 1202 may include an electrical component for scheduling power limited mobile devices 1204. For example, power limited mobile devices may be scheduled on inner subbands of an allocated spectrum. Further, logical grouping 1202 may comprise an electrical component for scheduling non power limited mobile devices 1206. For example, mobile devices without power limitations can be assigned to remaining portion of the allocated spectrum after scheduling power limited mobile devices. Moreover, logical grouping 1202 may include an electrical component for selecting subbands 1208. According to an example, subbands can be selected based upon considerations of power limitations of mobile devices as well as channel selectivity across subbands. Additionally, system 1200 may include a memory 1210 that retains instructions for executing functions associated with electrical components 1204, 1206, and 1208. While shown as being external to memory 1210, it is to be understood that one or more of electrical components 1204, 1206, and 1208 may exist within memory 1210.

Figure 13:
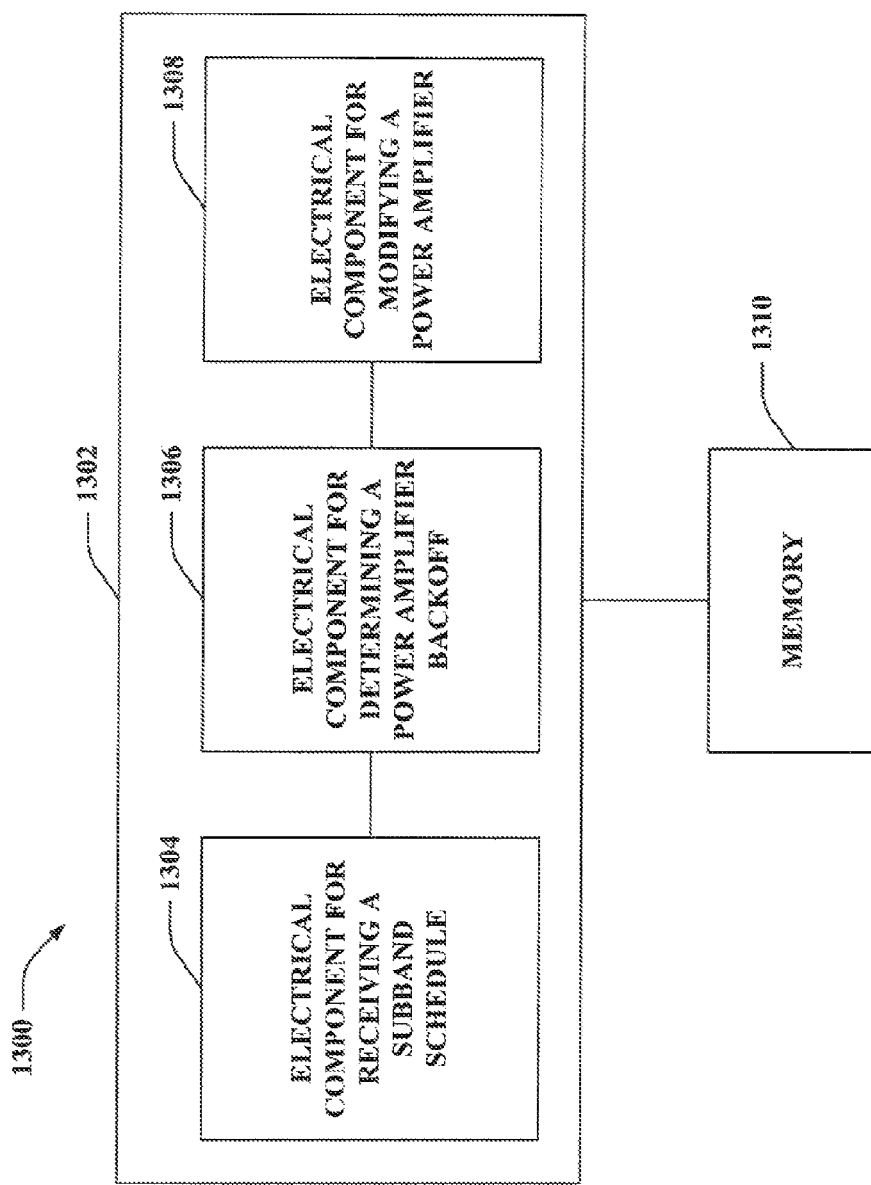
FIG. 13 is an illustration of an example system that facilitates power amplifier backoff adjustment.

Turning to FIG. 13, illustrated is a system 1300 that adjusts power on a reverse link. System 1300 may reside within a mobile device, for instance. As depicted, system 1300 includes functional blocks that may represent functions implemented by a processor, software, or combination thereof (e.g., firmware). System 1300 includes a logical grouping 1302 of electrical components that facilitate controlling forward link transmission. Logical grouping 1302 may include an electrical component for receiving a subband schedule 1304. For example, the subband schedule can indicate assignment to an inner subband or an edge subband. Moreover, logical grouping 1302 may include an electrical component for determining a power amplifier backoff 1306. For example, the power amplifier backoff is evaluated based upon the received subband schedule. According to one aspect, a high power backoff may be determined when the subband schedule indicates an edge subband assignment. A low backoff may be determined when the subband schedule indicates a middle subband assignment. Further, logical grouping 1302 may comprise an electrical component for modifying a power amplifier backoff 1308. After analyzing the subband schedule and evaluating a backoff, the power amplifier can be adjusted to mitigate power usage while maintaining an acceptable spectral mask margin. Additionally, system 1300 may include a memory 1310 that retains instructions for executing functions associated with electrical components 1304, 1306, and 1308. While shown as being external to memory 1310, it is to be understood that electrical components 1304, 1306, and 1308 may exist within memory 1310.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of mitigating non-linear distortion on a spectral mask margin, comprising:

receiving power limitation information from a first mobile device;

scheduling, based upon the power limitation information, the first mobile device on an inner subband of an allocated spectrum, wherein the power limitation information indicates the first mobile device is power-limited at maximum transmit power due to interference constraints, and wherein the inner subband is not at an edge of the allocated spectrum, wherein scheduling the first mobile device on the inner subband enables the first mobile device to determine a low power amplifier backoff for a power amplifier of the first mobile device; and scheduling a second mobile device on an edge subband at the edge of the allocated spectrum after scheduling the first mobile device, wherein scheduling the second mobile device on the edge subband enables the second mobile device to determine a high power amplifier backoff for a power amplifier of the second mobile device such that an adequate spectral mask margin is maintained.

2. The method of claim 1, wherein the power limitation information includes capabilities of the power amplifier of the first mobile device.

3. The method of claim 1, wherein the power limitation information comprises a maximum achievable transmit power for an assignment spanning at least one of the allocated spectrum, the inner subband, the edge subband, and a single base node.

4. The method of claim 1, wherein the power limitation information comprises a static differential power headroom corresponding to one of the edge subband, the inner subband, or a single base node.

5. The method of claim 1, wherein the first mobile device transmits at close to maximum transmit power.

6. The method of claim 1, wherein the second mobile device transmits at substantially less than maximum transmit power.

7. The method of claim 1, further comprising selecting a subband based in part on the power limitation information and channel selectivity.

8. The method of claim 1, further comprising inferring the power limitation information based at least in part on communications with one or more mobile devices.

9. The method of claim 1, wherein the first mobile device is a high quality of service (QoS) mobile device with a limited power amplifier size.

10. The method of claim 9, wherein the first mobile device is at a sector edge.

11. The method of claim 1, wherein the first mobile device is a best efforts mobile device at a sector edge, and the first mobile device is not constrained by interference control.

12. The method of claim 1, wherein the second mobile device is at least one of a best efforts device constrained by interference control, a device with a large power amplifier size, and a device with high carrier-to-interference (C/I) ratio.

13. The method of claim 1, wherein the first mobile device is power-limited at maximum transmit power due to interference constraints and the second mobile device is not power-limited at maximum transmit power due to interference constraints.

14. The method of claim 1, wherein the power limitation information includes a maximum power the first mobile device can achieve if a bandwidth assignment spans an entire bandwidth, the inner subband, or a single base node.

15. The method of claim 1, wherein the power limitation information includes a location of the first mobile device within a sector or cell or location information relative to more than one sector or cell.

16. A wireless communications apparatus, comprising:
a memory that retains instructions for:
receiving power limitation information from a first mobile device;
scheduling, based at least in part on the power limitation information, the first mobile device on an inner subband of an allocated spectrum, wherein the power limitation information indicates the first mobile device is power-limited at maximum transmit power due to interference constraints, and wherein the inner subband is not at an edge of the allocated spectrum, wherein scheduling the first mobile device on the inner subband enables the first mobile device to determine a low power amplifier backoff for a power amplifier of the first mobile device, and
scheduling a second mobile device on an edge subband at the edge of the allocated spectrum after scheduling the first mobile device, wherein scheduling the second mobile device on the edge subband enables the second mobile device to determine a high power amplifier backoff for a power amplifier of the second mobile device such that an adequate spectral mask margin is maintained; and
an integrated circuit coupled to the memory and configured to execute the instructions retained in the memory.

17. A wireless communications apparatus that enables dynamic power amplifier backoff, comprising:
means for processing configured to:
receive power limitation information from a first mobile device;
schedule, based upon the power limitation information, the first mobile device on an inner subband of an allocated spectrum, wherein the power limitation information indicates the first mobile device is power-limited at maximum transmit power due to interference constraints, and wherein the inner subband is not at an edge of the allocated spectrum, wherein the first mobile device being scheduled on the inner subband enables the first mobile device to determine a low power amplifier backoff for a power amplifier of the first mobile device; and
schedule a second mobile device on an edge subband at the edge of the allocated spectrum after the first mobile device is scheduled, wherein the second mobile device being scheduled on the edge subband enables the second mobile device to determine a high power amplifier backoff for a power amplifier of the second mobile device such that an adequate spectral mask margin is maintained.

18. The wireless communications apparatus of claim 17, wherein the power limitation information includes capabilities of the power amplifier of the first mobile device.

19. The wireless communications apparatus of claim 17, wherein the power limitation information comprises a maximum achievable transmit power for an assignment spanning at least one of the allocated spectrum, the inner subband, the edge subband, and a single base node.

20. The wireless communications apparatus of claim 17, wherein the power limitation information comprises a static differential power headroom corresponding to one of the edge subband, the inner subband, or a single base node.

21. The wireless communications apparatus of claim 17, wherein the first mobile device transmits at close to maximum transmit power.

22. The wireless communications apparatus of claim 17, wherein the second mobile device transmits at substantially less than maximum transmit power.

23. The wireless communications apparatus of claim 17, wherein the means for processing is further configured to select subbands further based upon channel selectivity.

24. The wireless communications apparatus of claim 17, wherein the means for processing is further configured to infer the power limitation information based at least in part on communications with one or more mobile devices.

25. The wireless communications apparatus of claim 17, wherein the first mobile device is a high quality of service (QoS) mobile device with a limited power amplifier size.

26. The wireless communications apparatus of claim 25, wherein the first mobile device is at a sector edge.

27. The wireless communications apparatus of claim 17, wherein the first mobile device is a best efforts mobile device at a sector edge, wherein the first mobile device is not constrained by interference control.

28. The wireless communications apparatus of claim 17, wherein the second mobile device is at least one of a best efforts device constrained by interference control, a device with a large power amplifier size, or a device with high carrier-to-interference (C/I) ratio.

29. A non-transitory computer-readable medium, comprising code stored thereon that, if executed by a computer, causes the computer to execute a method comprising:
receiving power limitation information from a first mobile device;
scheduling, based at least in part on the power limitation information, the first mobile device on an inner subband of an allocated spectrum, wherein the power limitation information indicates the first mobile device is power-limited at maximum transmit power due to interference constraints, and wherein the inner subband is not at an edge of the allocated spectrum, wherein scheduling the first mobile device on the inner subband enables the first mobile device to determine a low power amplifier backoff for a power amplifier of the first mobile device; and
scheduling a second mobile device on an edge subband at the edge of the allocated spectrum after scheduling the first mobile device, wherein scheduling the second mobile device on the edge subband enables the second mobile device to determine a high power amplifier backoff for a power amplifier of the second mobile device such that an adequate spectral mask margin is maintained.

30. The non-transitory computer-readable medium of claim 29, wherein the method further comprises selecting a subband based in part on the power limitation information and channel selectivity.

31. The non-transitory computer-readable medium of claim 30, wherein the method further comprises inferring the power limitation information based at least in part on communications with one or more of the first and second mobile devices.

32. In a wireless communication system, an apparatus comprising:
an integrated circuit configured to:
receive power limitation information from a first mobile device;
schedule, based at least in part on the power limitation information, the first mobile device on an inner subband of an allocated spectrum, wherein the power limitation information indicates the first mobile device is power-limited at maximum transmit power due to interference constraints, and wherein the inner subband is not at an edge of the allocated spectrum, wherein the first mobile device being scheduled on the inner subband enables the first mobile device to determine a low power amplifier backoff for a power amplifier of the first mobile device; and schedule a second mobile device on an edge subband at the edge of the allocated spectrum after the first mobile device is scheduled, wherein the second mobile device being scheduled on the edge subband enables the second mobile device to determine a high power amplifier backoff for a power amplifier of the second mobile device such that an adequate spectral mask margin is maintained.

33. The apparatus of claim 32, wherein the integrated circuit is further configured to select a subband based in part on the power limitation information and channel selectivity.

34. The apparatus of claim 32, wherein the integrated circuit is further configured to infer power limitation information based at least in part on communications with one or more of the first and second mobile devices.

35. The apparatus of claim 34, wherein the power limitation information further comprises a maximum achievable transmit power for an assignment spanning at least one of the allocated spectrum, the inner subband, the edge subband, and a single base node.

36. The apparatus of claim 34, wherein the power limitation information comprises a static differential power headroom corresponding to one of the edge subband, the inner subband, or a single base node.

37. The apparatus of claim 32, wherein the power limitation information includes capabilities of the power amplifier of the first mobile device.

38. The apparatus of claim 32, wherein the first mobile device transmits at close to maximum transmit power.

39. The apparatus of claim 32, wherein the first mobile device transmits at substantially less than maximum transmit power.

40. The apparatus of claim 32, wherein the first mobile device is a high quality of service (QoS) mobile device with a limited power amplifier size.

41. The apparatus of claim 40, wherein the first mobile device is at a sector edge.

42. The apparatus of claim 32, wherein the first mobile device is a best efforts mobile device at a sector edge, wherein the first mobile device is not constrained by interference control.

43. The apparatus of claim 32, wherein the second mobile device is at least one of a best efforts device constrained by interference control, a device with a large power amplifier size, and a device with high carrier-to-interference (C/I) ratio.

* * * * *